United States Patent

Pullan

[11] 4,114,320
[45] Sep. 19, 1978

[54] DOOR SEALS

[75] Inventor: Ronald Ernest Pullan, Leeds, England

[73] Assignee: Schlegel(UK) Limited, Leeds, England

[21] Appl. No.: 821,526

[22] Filed: Aug. 3, 1977

[30] Foreign Application Priority Data

Aug. 31, 1976 [GB] United Kingdom .............. 36061/76

[51] Int. Cl.² .............................................. E06B 7/16
[52] U.S. Cl. ....................................... 49/491; 49/497; 428/122
[58] Field of Search ................. 49/491, 490, 497, 498; 52/716–718; 428/122

[56] References Cited

U.S. PATENT DOCUMENTS

| 2,263,806 | 11/1941 | Hammerl | 49/498 |
| 3,025,576 | 3/1962 | Herman | 49/497 |
| 4,010,573 | 3/1977 | Andrzejewski | 49/491 X |
| 4,067,146 | 1/1978 | Mesnel et al. | 49/490 |

FOREIGN PATENT DOCUMENTS

| 566,019 | 11/1958 | Canada | 428/122 |
| 1,378,615 | 12/1974 | United Kingdom | 49/497 |
| 1,456,086 | 11/1976 | United Kingdom | 49/491 |

Primary Examiner—Philip C. Kannan
Attorney, Agent, or Firm—Cumpston & Shaw

[57] ABSTRACT

A seal for sealing the gap between the door frame and edge of the door on a motor vehicle having a waistline such that the angle of approach of the door to the door frame is different above the waistline from the angle of approach below the waistline, thus requiring different sealing characteristics above and below the waistline, said seal being extruded from resiliently deformable plastics or rubber material and comprising a tubular portion, one face of which is for connection to a U-shaped edge trim or other member, and another face portion of which is arranged to be abutted and deformed by the edge of the vehicle door when the latter is closed, the seal being characterized by a deforming portion extending from and connected to said tubular portion, the deforming portion being arranged when the seal is fitted to a flange surrounding said door opening to be deflected into engagement with a part of said tubular portion to deform the latter and change its cross-section, thereby altering its sealing characteristics as desired, the arrangement being such that if the sealing characteristics are not to be altered, i.e. below the waistline, the deforming portion is removed from the seal. The seal is preferably an extruded rubber component which may be attached by gluing to an extruded plastics edge trim or, alternatively, if the edge trim is rubber, the seal may be extruded in one piece with the edge trim.

10 Claims, 5 Drawing Figures

DOOR SEALS

This invention relates to an improved door seal for motor vehicles.

In all motor vehicles it is necessary to provide a seal between the various doors and door openings and in some cases between the boot and the boot opening. Normally, such seals are adhered to a U-shaped edge protector trim strip or weatherstrip or are formed in one with the edge protector, but it will be appreciated that the present invention is intended to relate to the seal per se.

On modern motor cars, the car has a waistline and the relative position of the door edge relative to the door frame is often different below the waistline from the relative positions above the waistline. This means that ideally the shape of the door seal which seals the gap between the frame and the door edge when the door is closed, for maximum sealing and draught and weather exclusion, should be slightly different where it is applied to the door frame above the waistline from the shape where it is applied below the waistline. The reason why the shape has to be different is that above the waistline the upper part of the door frame often contacts the seal at a different place from the place contacted below the waistline. It is particularly important that a good seal is achieved above the waistline because at high motoring speeds the upper portion of the door frame tends to lift away from the seal.

In the past, the above-mentioned problem has been partly solved by designing a door seal with a common profile to suit conditions both above and below the car waistline. Other attempts have been made at solving the problem by designing two different rubber seal profiles, one for above the waistline and one for below the waistline, each of the profiles having the same external circumference but a different cross-section, and then adhering the end face of one to the end face of the other at waistline level. Since the seals are almost always formed of a sponge rubber material which is then often adhered to a plastics edge trim, this requires several joining steps requiring a high degree of hand work, all of which is very expensive. Also, because of the joins, the appearance of the seal/edge trim is highly unsatisfactory.

According to the present invention, we provide a seal for sealing the gap between the door frame and edge of the door on a motor vehicle, the seal being extruded from resiliently deformable plastics or rubber material and having a tubular portion, one face portion of which is adapted to be connected to an edge trim or other member, and another face portion remote from said one face portion which, in use, is abutted by and deformed by the edge of the door, when the latter is closed, and wherein a deforming portion is connected to the tubular portion, preferably by a spacer arm, the deforming portion (and its spacer arm when provided) being adapted in use to be deflected into engagement with a part of the tubular portion to deform the latter and change its cross-section, thereby altering its sealing characteristics as desired.

Preferably, the deforming portion is bulbous, preferably generally in the form of a circular tube with the spacer arm extending tangentially therefrom, the other end of the spacer arm merging into said one face portion of the tubular portion.

Preferably, the said one face portion of the tubular portion is attached to the other face of the arm of a U-shaped edge trim so that the spacer arm extends away from the free end of said arm, and the edge trim is provided with internal gripper fins, which hold the trim on a flange around the motor vehicle door opening, the edge trim being generally of known construction.

According to the present invention, we also provide a method of sealing the gap between the door frame and edge of a door on a motor vehicle having a waistline which is such that the relative positions of the door edge and door frame are different below the waistline and above the waistline, wherein a generally U-shaped edge trim having a tubular seal portion extending from the other face of one of the arms of the U and a deforming portion connected to the tubular portion to depend therefrom, is fitted onto the flange surrounding the door opening, removing at least that part of the deforming portion of the seal on that portion of the edge trim which is to be located below the waistline in the door opening, whereby when the edge trim is applied to said flange the tubular portion of the seal located below the waistline generally keeps its normal manufactured shape, whereas above the waistline, the deforming portion is deflected into engagement with the tubular portion of the seal so as to deform the tubular portion from its normal manufactured shape and change its sealing characteristics to meet the sealing requirements above the waistline.

The invention is now described by way of example with reference to the accompanying drawings, in which.

Figure 1:
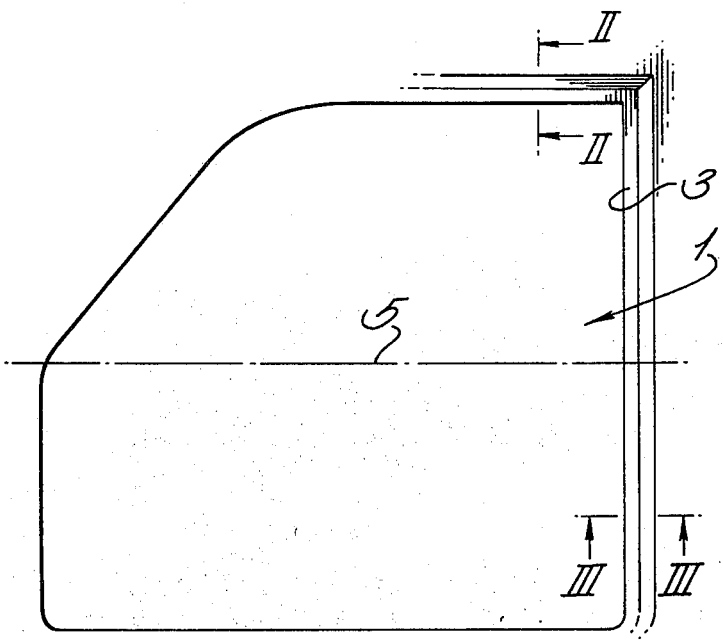
FIG. 1 is a schematic representation of a typical door opening in a motor vehicle.

Referring to the drawings, the door opening 1 is defined by a flange 3, the flange being divided into upper and lower portions by the waistline 5 of the vehicle. Above the waistline 5 of the vehicle the edge 7 of the vehicle's door has a different shape from the edge 9 of the door below the waistline 5 and, furthermore, approaches the flange 3 at a slightly different angle from its angle of approach below the waistline. To give an ideal seal, therefore, the seal, when it is applied to the flange 3, should have a different shape above the waistline from that below the waistline, as can be seen by comparing FIG. 2 with FIG. 3.

Figure 2:
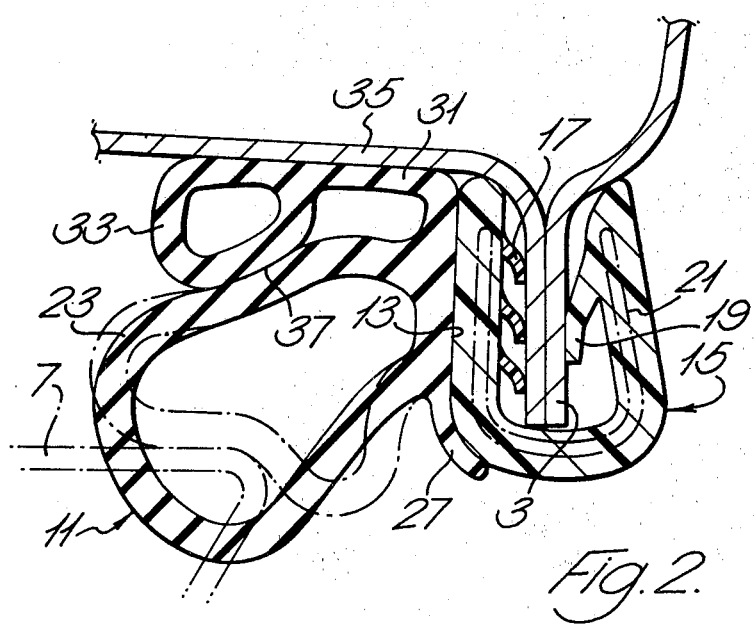
FIG. 2 is a section taken on the line II—II of FIG. 1, showing a seal according to the present invention attached to an edge trim mounted on the flange defining the door opening above the vehicle's waistline, the position that the edge of the door takes up when the door is closed and the deformed position of the seal being shown in outline.
Figure 3:
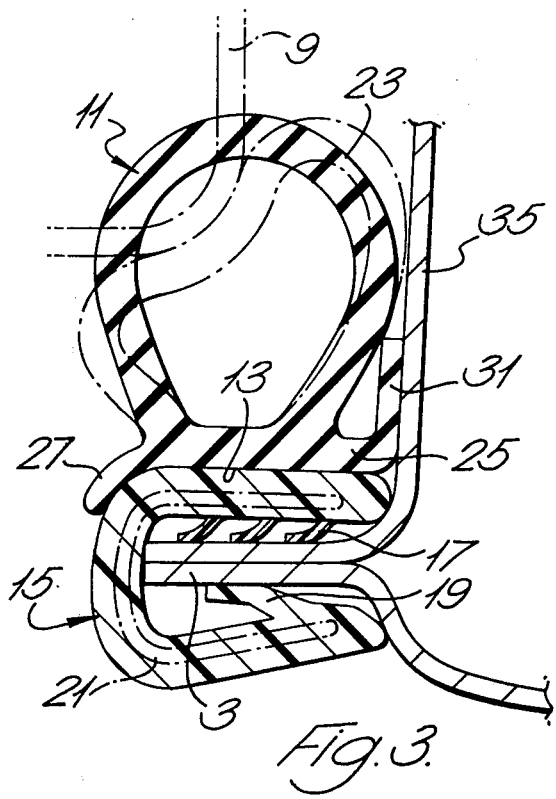
FIG. 3 is a view similar to FIG. 2 but taken on the line III—III of FIG. 1, part of the seal having been removed to give a different sealing performance.
Figure 4:
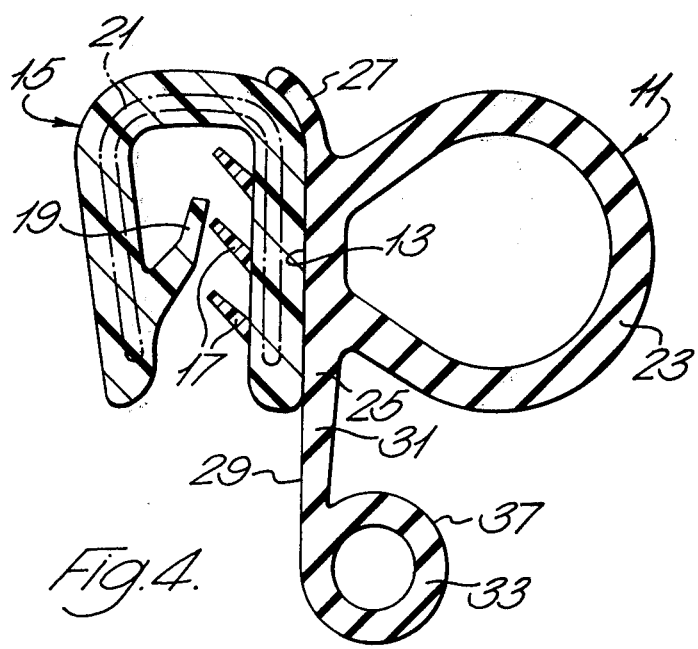
FIG. 4 is a cross-sectional view of the seal of the invention connected to an edge trim prior to application to a flange.

Referring to FIGS. 2–4 and in particular to FIG. 4, the seal according to the invention is shown at 11 and is attached by adhesive along a first face 13 to a generally U-shaped edge trim 15 provided with three small soft fins 17 and one large dog-leg shaped harder fin 19. Normally, the edge trim 15 would have a metal carrier 21, for example of knitted wire located within it, but it will be appreciated that the edge trim 15 can be of any known construction with or without gripper fins. What is more, it could be extruded in one with the seal 11, as will be described hereinafter with reference to FIG. 5, or the seal can be supplied on its own for subsequent connection, for example by means of adhesive, directly to the flange around a door opening.

The seal 11 has a tubular portion 23 of generally known cross-sectional shape and if the face 13 is taken as being located at a 6 o'clock position, a face of the periphery of the seal somewhere between 9 o'clock and 12 o'clock is normally contacted by the door edge 9 and deformed to provide a seal between the door and door opening as can be seen from FIG. 3. On most modern motor vehicles, the tubular portion 23 is sufficient to provide a seal around the whole of the door opening and at most the face 13 of the seal is provided with a short tail at 25 similar to the upper tail 27 to assist in adhering the seal to the edge trim 15.

In accordance with this invention, however, the face 13 of the seal is extended considerably as shown at 29 (FIG. 4) so as to define a spacer arm 31 from the outer end of which a deforming, bulbous portion 33 extends. As shown, the bulbous portion 33 is hollow, generally circular and of the same material as the remainder of the seal and the arm 31 is tangential to the portion 33. This portion 33 is specially provided so that when the seal is fitted to a door flange on a motor car, through the intermediary of the edge trim 15 as shown, the cross-sectional shape of the tubular portion 23 can be changed if desired due to the presence of the portion 33.

If the seal as shown in FIG. 4 is fitted to the flange 3 as shown in FIG. 2, the bulbous portion 33 and its spacer arm 31 will be caused by the sheet material of the car body to pivot during fitting through approximately 90° so that a face portion 37 of the portion 33 will move into abutting relationship with a face of the tubular portion 23 between about the 9 o'clock and 12 o'clock positions (in FIG. 2) so as to deform the tubular portion 23 from its shape shown in FIG. 4 to the shape shown in FIG. 2. This means that the tubular portion 23 can be deformed as required to give the best possible sealing characteristics at the required location for the particular shape and angle of approach of the door edge 7 as can be seen from FIG. 2. Such deformation is necessary on various motor cars to seal the gap between door opening and door edge above the waistline of the car. As can be seen from FIG. 2, the sealing is really required at a slightly different location in FIG. 2 (above the waistline) from that required in FIG. 3 (below the waistline).

Below the waistline (FIG. 3) sealing is required at the traditional location and in order to achieve this with the seal of the present invention, it is necessary for the bulbous portion 33 of the seal and perhaps a part of the spacer arm 31 to be cut away. This can be done simply by hand or on a machine so that when the seal is fitted to the flange 3 as shown in FIG. 3, the tubular portion 23 will maintain its original position. Hence, it will be appreciated that a door seal is provided which, by cutting away a portion of the seal prior to fitting to the door aperture flange, can provide two different sealing requirements.

It is a very simple and cheap operation to cut away a part of the seal and in spite of the waste of material which then occurs, such a seal turns out to be considerably cheaper than the specially assembled ones formed of two different parts as described above. What is more, it will be appreciated that by changing the shape and dimensions and relative position of the arm 31 and bulbous portion 33 relative to the tubular portion 23 and by changing the shape of the tubular portion 23, numerous different sealing requirements can be met.

Figure 5:
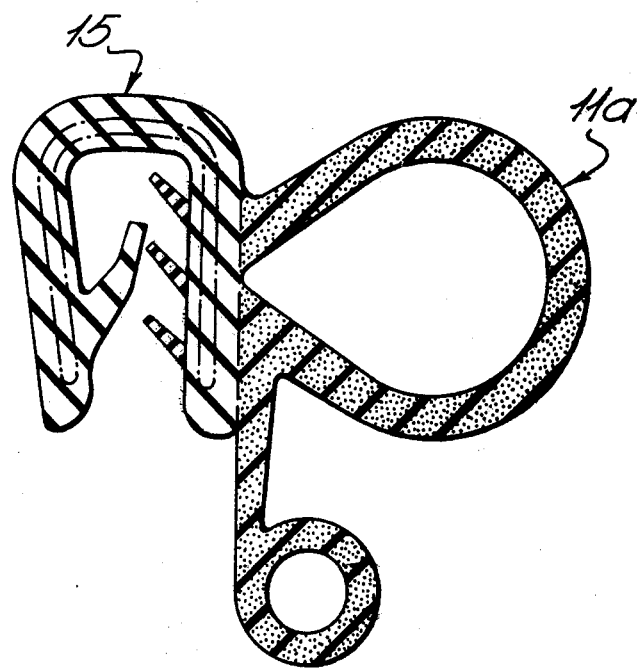
FIG. 5 is a view similar to FIG. 4 but showing an all-rubber seal and edge trim extruded in one piece.

An alternative construction of seal is illustrated in FIG. 5, this construction being a one-piece rubber extrusion. The edge trim 15 is of the same construction as that shown in FIG. 4 but the seal 11a, instead of being formed separate from the edge trim, is extruded integrally with it, the edge trim being of a solid rubber and the seal 11a being of a sponge rubber. In every other respect the product is the same as that shown in FIG. 4 and functions in the same way.

What is claimed is:

1. A seal for sealing the gap between a door frame and edge of a door on a motor vehicle, said seal being extruded from resiliently deformable plastics or rubber material and comprising a tubular portion, one face portion of which is adapted to be connected to said door frame, and another face portion remote from said one face portion which, in use, is abutted by and deformed by the edge of said door when the latter is closed, and a deforming member having one end portion connected to said tubular portion, and its opposite free end portion normally spaced from said tubular portion and extending toward said door frame when said seal is in position to be mounted on said door frame, said deforming member further having means for engaging said door frame when said seal is mounted on said door frame whereby said free end portion is deflected by said door frame into engagement with a part of said tubular portion to deform the latter and change its cross-section, thereby altering its sealing characteristics.

2. A seal as claimed in claim 1 wherein said one end portion comprises a spacer arm connecting said deforming member to said tubular portion.

3. A seal as claimed in claim 1 wherein said opposite free end portion is bulbous.

4. A seal as claimed in claim 2 wherein said opposite free end portion of said deforming member is generally in the form of a circular tube, and said spacer arm extends tangentially therefrom, with one end of said spacer arm merging into said one face portion of said tubular portion.

5. A seal as claimed in claim 2, and further comprising a U-shaped edge trim securable to said door frame, means connecting said one face portion of said tubular portion to the outer face of one arm of said U-shaped edge trim so that said spacer arm extends away from the free end of said arm, and internal gripper fins on said edge trim which hold said trim on a flange on said door frame.

6. A seal as claimed in claim 2 wherein said one face portion is integral with a U-shaped edge trim, said one face portion of said tubular portion merging with an arm of said edge trim and being so constructed that said spacer arm extends away from a free end of said arm of said edge trim.

7. A method of sealing the gap between the door frame and edge of a door on a motor vehicle having a waistline which is such that the relative positions of the door edge and door frame are different below the waistline and above the waistline, said method comprising the steps of fitting a generally U-shaped edge trim having a tubular seal portion extending from the outer face of one of the arms of the U-shaped edge trim, and a deforming portion connected to the tubular portion to extend therefrom, onto a flange on said door frame, and removing at least that part of said deforming portion of said seal on that portion of said edge trim which is to be located below said waistline in said door frame, so that when the edge trim is applied to said flange, said tubular portion of said seal located below said waistline generally keeps its normal manufactured shape, whereas above said waistline, said deforming portion is deflected by said flange into engagement with said tubular portion of said seal so as to deform said tubular portion from its normal manufactured shape and change its sealing characteristics to meet the sealing requirements above said waistline.

8. A method as claimed in claim 7 wherein said deforming portion is connected to said tubular portion by a spacer arm and wherein only said deforming portion is removed from the portion of said seal to be located below said waistline wherein said spacer arm will be deformed to increase the sealing characteristics of said edge trim.

9. A method of sealing the gap between the door frame and edge of a door on a motor vehicle having a waistline which is such that the relative positions of the door edge and door frame are different below the waistline and above the waistline, said method comprising the steps of securing a face of a seal to the door frame, said seal having a tubular seal portion extending from said face, and a deforming portion connected to said tubular portion and extending therefrom onto said door frame, and removing at least that part of said deforming portion of said seal which is to be located below said waistline of said door frame, so that when said seal is applied to said door frame, said tubular portion of said seal located below said waistline generally keeps its normal manufactured shape, whereas above said waistline, said deforming portion is deflected by said door frame into engagement with said tubular portion of said seal so as to deform said tubular portion from its normal manufactured shape and change its sealing characteristics to meet the sealing requirements above said waistline.

10. A seal for sealing the gap between a door opening and an edge of the door on a motor vehicle, said seal being extruded from resiliently deformable plastics or rubber material and comprising an edge trim portion for application to a flange surrounding the door opening, said edge trim portion being of generally U-shaped cross-section, a tubular sealing portion, one face portion of which is connected to an outer face of one arm of said edge trim portion, and another face portion remote from said one face portion which, in use, is abutted by and deformed by the edge of said door when the latter is closed, and a deforming portion connected to said tubular portion, and projecting from said tubular portion so as to extend beyond the free end of the arm of the edge trim portion to which said tubular portion is connected, the deforming portion, when said edge trim is applied to said flange, being deflected by said flange into engagement with a part of said tubular portion to deform the latter and change its cross-section, thereby altering its sealing characteristics as desired.

* * * * *